United States Patent
Ono

[19]

[11] Patent Number: 6,130,768
[45] Date of Patent: Oct. 10, 2000

[54] SCANNING IMAGE FORMING LENS AND OPTICAL SCANNING APPARATUS

[75] Inventor: Nobuaki Ono, Yokohama, Japan

[73] Assignee: Ricoh Company, Ltd., Japan

[21] Appl. No.: 09/132,301

[22] Filed: Aug. 11, 1998

[30] Foreign Application Priority Data

Aug. 18, 1997 [JP] Japan .................................... 9-221603
May 22, 1998 [JP] Japan .................................. 10-140776

[51] Int. Cl.[7] .................................................. G02B 26/08
[52] U.S. Cl. ......................... 359/207; 359/205; 359/206; 359/216; 359/217
[58] Field of Search ................................... 359/204–207, 359/216–219, 662, 708, 711, 717, 795; 347/243–244, 258–261

[56] References Cited

U.S. PATENT DOCUMENTS 5,453,870 9/1995 Iima ........................................ 359/205
5,671,079 9/1997 Nagasaka et al. ...................... 359/205

FOREIGN PATENT DOCUMENTS 6-230308 8/1994 Japan .
8-297256 11/1996 Japan .

*Primary Examiner*—James Phan
*Attorney, Agent, or Firm*—Graham & James LLP

[57] ABSTRACT

A scanning image forming lens in an optical scanning apparatus for optically scanning a surface to be scanned at a constant velocity by deflecting a luminous flux formed as a linear image in a direction corresponding to a main scanning direction by an optical deflector having a deflecting reflective plane in the vicinity of the linear image so as to collect the deflected luminous flux on the surface to be scanned as a light spot with a scanning image forming lens, includes two lenses. The first lens provided at the optical deflector side is a positive meniscus lens with a concave surface facing toward the optical deflector side and has a co-axial aspherical shape at both sides. The second lens provided at the surface to be scanned side is symmetrical relative to an optical axis thereof and has a non-arc shape in the deflected plane at least at one surface, and the non-arc surface is shaped such that the radius of curvature in the sub scanning cross-section changes in the direction corresponding to the main scanning direction in a manner such that the curvature center line plotting the curvature center in the sub scanning cross-section of the lens surface in the direction corresponding to the main scanning direction is a curve different from the non-arc shape in the deflected plane.

31 Claims, 5 Drawing Sheets

CURVATURE OF FIELD (mm)

f θ CHARACTERISTIC,
LINEARITY (%)

CURVATURE OF FIELD (mm)

f θ CHARACTERISTIC, LINEARITY (%)

SCANNING IMAGE FORMING LENS AND OPTICAL SCANNING APPARATUS

BACKGROUND OF THE INVENTION

1. Field of the Invention

The present invention relates to a scanning image forming lens and an optical scanning apparatus.

2. Description of the Related Art

An optical scanning apparatus for optically scanning a surface to be scanned at a constant velocity by deflecting a luminous flux formed as a linear image, in a direction corresponding to a main scanning direction, via an optical deflector having a deflecting reflective plane located in the vicinity of the linear image, so as to transmit the deflected luminous flux to a scanning image forming lens which collects the deflected luminous flux on the surface to be scanned as a light spot, is well known in an image forming apparatus such as an optical printer, a digital copier, and the like.

The above-mentioned main scanning direction refers to the direction corresponding to a scanning direction on an optical path extending from a light source to a surface to be scanned. A sub-scanning direction is a direction corresponding to a scanning direction along the optical path which is substantially perpendicular to the main scanning direction. The plane swept by the principal ray of a luminous flux which is optimally deflected by an optical deflector is referred to as the deflected plane in this specification.

The above-mentioned scanning image forming lens is designed to achieve a well known and desired conjugating function by which a geometrical-optically conjugate relationship between the image forming position of the linear image and the surface to be scanned in the direction corresponding to the sub scanning direction is achieved. Also, the above-mentioned scanning image forming lens is also designed to achieve a constant velocity function for having the optical scan performed at a constant velocity. The above-mentioned conjugating function is desired for compensating or correcting for a tilt or positional error of the deflecting reflective plane in the optical deflector which causes errors in scanning accuracy.

In addition to the condition that the above-mentioned conjugating function and constant velocity function of the scanning image forming lens are achieved, the curvature of field must also be accurately corrected and compensated for in the main and sub scanning directions in order to achieve a good optical scan. Unless the curvature of field is sufficiently corrected in the main and sub scanning directions, the light spot diameter changes according to the image height of the light spot, resulting in a significant reduction in the resolution of the image to be written, and consequently causing deterioration of the image quality of the written image.

A scanning image forming lens with the radius of curvature in the sub scanning cross-section (a flat cross-section which is substantially perpendicular to the direction corresponding to the main scanning direction in the vicinity of the lens surface) which has been changed according to positions in the direction corresponding to the main scanning direction in at least one lens surface of the scanning image forming lens for compensating the curvature of field in the sub scanning direction is disclosed, for example, in Japanese Unexamined Patent Publication No. 6-230308.

The radius of curvature in the sub scanning cross-section is changed so as to increase continuously in accordance with increasing distance of the position from the optical axis in the direction corresponding to the main scanning direction in the scanning image forming lens disclosed in JP 6-230308. Although the curvature of field in the sub scanning direction is corrected as described above, the above-mentioned radius of curvature drastically differs at the deflection angle of 0 (corresponding to the optical axis portion of the effective main scanning region) and at the maximum deflection angle (corresponding to the end portion of the effective main scanning region). In addition, the lens having the surface in which the curvature of field in the sub scanning direction is corrected, is not symmetrical or "asymmetrical" relative to an optical axis of the scanning image forming lens which is axis a in the Figures of JP 6-230308.

As a result, when a lens with the surface shape as disclosed in JP 6-230308 is assembled in a scanning apparatus and if an assembling error such as decentering, shifting, or the like, occurs, the curvature of field in the sub scanning direction is significantly deteriorated. Therefore, the above-mentioned scanning image forming lens has a problem in that positional accuracy of mounting and fixing the lens in an optical scanning apparatus must be very high and has very strict positional tolerance which makes the assembling process extremely difficult, time consuming and expensive and still results in a high probability of significant deterioration of curvature of field caused by assembling errors.

A scanning image forming lens such as that described above can be produced by plastic molding. However, sometimes it is difficult to obtain a lens with a desired shape due to sinking of a part of the surface of the lens (generally referred to sinking or waving) during the molding process. Furthermore, the optical characteristics of a lens produced by plastic molding can be easily changed by the influence of the temperature and humidity. Moreover, since a rotating polygon mirror commonly used as an optical deflector does not have the rotation axis of the deflecting reflective plane in the deflecting reflective plane, a "sag" condition where the positional relationship between the linear image formed in the vicinity of the deflecting reflective plane and the deflecting reflective plane changes according to the rotation of the rotating polygon mirror, may occur.

SUMMARY OF THE INVENTION

The preferred embodiments of the present invention overcome the problems described above by providing a lens having an accurate correction of curvature of field in the main and sub scanning directions while maintaining an excellent conjugating function and a constant velocity function in an optical scanning apparatus and a scanning image forming lens.

The preferred embodiments of the present invention also provide a scanning image forming lens which is constructed so as to: prevent sinking and/or waving when the scanning image forming lens is formed by plastic molding, to avoid the influence from changes in temperature or humidity when the scanning image forming lens includes a plastic lens, to effectively eliminate a manufacturing and assembling tolerance with respect to positional errors in assembling the scanning image forming lens in an optical scanning apparatus, and to effectively eliminate the influence of sag on the optical scan when the deflector includes a rotating polygon mirror.

A scanning image forming lens of a preferred embodiment of the present invention is a lens system provided on an optical path having an optical axis and being located between an optical deflector and a surface to be scanned in an optical scanning apparatus for optically scanning the surface to be scanned at a constant velocity by deflecting a luminous flux formed as a linear image in the direction corresponding to the main scanning direction by the optical deflector having a deflecting reflective plane in the vicinity of the linear image so as to collect the deflected luminous flux on the surface to be scanned as a light spot with the scanning image forming lens.

The scanning image forming lens according to preferred embodiments of the present invention preferably includes two lenses. The first lens provided at an optical deflector side along the optical path is a positive meniscus lens with a concave surface facing to the optical deflector side, having a co-axial aspherical shape at both sides of the positive meniscus lens. The co-axial aspherical shape provides improved performance and allows for more accurate impingement of the deflected light flux on the first lens to minimize aberrations of the image.

The second lens provided at the side of the surface to be scanned is symmetrical relative to the optical axis of the optical system and has a non-arc shape in the deflected plane at least at one surface. The non-arc surface is shaped such that the radius of curvature in the sub scanning cross-section changes in the direction corresponding to the main scanning direction in a manner such that a curvature center line plotting the curvature center in the sub scanning cross-section of the lens surface in the direction corresponding to the main scanning direction is a curve that is different from the above-mentioned non-arc shape in the deflected plane.

As mentioned above, the sub scanning cross-section refers to the flat cross-section which is perpendicular to the direction corresponding to the main scanning direction in the vicinity of the above-mentioned lens surface.

In one preferred embodiment, the two lenses constituting the scanning image forming lens can be arranged to have a tilt angle in the deflected plane in order to eliminate the influence of the sag which is described later. In this case, the above-mentioned sub scanning cross-section refers to the flat cross-section which is perpendicular to the direction corresponding to the main scanning direction in the state before providing the tilt angle, that is, in the state where the tilt angle is 0 for each lens.

The non-arc shape is a curved shape represented by the known formula (1) as follows where the X coordinate is plotted in the lens optical axis direction and the Y coordinate is plotted in the direction orthogonal to the optical axis, R is the paraxial radius of curvature, K is the cone constant, and A, B, C, D are higher coefficients, which can be obtained by specifying values for R, K, A, B, C, D, . . . :

$$X = (Y^2/R)/\left[1 + \sqrt{\{1-(1+K)(Y/R)^2\}}\right] + \\ A \cdot Y^4 + B \cdot Y^6 + C \cdot Y^8 + D \cdot Y^{10} \qquad (1)$$

Since the above-mentioned first lens provided at the optical deflector side is a meniscus lens, the "uniform thickness" can be realized. That is, a difference in thickness of the lens, between the center portion of the lens and the peripheral portion of the lens, particularly between the center portion and the peripheral portion in the direction corresponding to the main scanning direction can be effectively eliminated. Therefore, deformation such as sinking or waving in the molding process when using a resin such as plastic can be effectively prevented. Further, since the first lens at the optical deflector side is provided with the concave surface facing to the optical deflector side, any change in the distance from the deflection origin to the incident side lens surface between the center portion and the peripheral portion in the direction corresponding to the main scanning direction is small. Therefore, the difference of the lateral magnification in the direction corresponding to the sub scanning direction between the center portion and the peripheral portion is small.

As mentioned above, since the scanning image forming lens according to the present invention has at least three surfaces having a non-arc shape in the deflected plane, the curvature of field and the constant velocity characteristic in the main scanning direction can be corrected accurately and completely by providing an optimal non-arc shape.

Moreover, since two surfaces (both sides of the lens provided at the optical deflector side) have a non-arc shape in the plane parallel to the optical axis and perpendicular to the deflected plane (in the state where the tilt angle is 0 when the tilt angle is provided as mentioned above) and the radius of curvature in the sub scanning cross-section is changed in the direction corresponding to the main scanning direction in at least one surface of the second lens provided at the side of the surface to be scanned, the curvature of field in the sub scanning direction can be effectively corrected by providing an optimal radius of curvature which changes according to the non-arc shape optimized for the curvature of field and the constant velocity characteristic in the main scanning direction.

The above lens surface of the second lens, which has a non-arc shape in the deflected plane and shaped such that the radius of curvature in the sub scanning cross-section changes in the direction corresponding to the main scanning direction in a manner such that the curvature center line plotting the curvature center in the sub scanning cross-section of the lens surface in the direction corresponding to the main scanning direction is a curve that is different from the above-mentioned arc shape in the deflected plane, is preferably located at the optical deflector side (third surface). In this case, the lens surface of the second lens at the side of the surface to be scanned (fourth surface) can have an arc shape in the deflected plane. Also, the second lens having the third and fourth surfaces as described above is symmetrical relative to the optical axis of the scanning image forming lens and the optical system. This arrangement is preferred as it provides maximum lens performance.

In another preferred embodiment, the arc shaped surface may be provided at the side of the optical deflector (third surface) and the non-arc shaped surface may be provided at the side of the surface to be scanned (fourth surface).

Further, the second lens at the surface to be scanned side can have a negative refractive power in the deflected plane. As mentioned above, since the first lens at the optical deflector side is a positive meniscus lens, with the second lens provided at the surface to be scanned side having a negative refractive power in the deflected plane, the combination of the refractive power of the scanning image forming lens in the deflected plane can be a combination of positive and negative powers, when both of the two lenses constituting the scanning image forming lens are plastic lenses, the influence of the temperature and humidity change can be offset by the lenses. As a result, the influence of the temperature and humidity change on the scanning image forming lens can be minimized.

The absolute value of the radius of curvature of the lens surface of the second lens provided at the side of the surface to be scanned, the lens surface having a non-arc shape in the deflected plane and shaped such that the radius of curvature in the sub scanning cross-section changes in the direction corresponding to the main scanning direction in a manner that the curvature center line plotting the curvature center in the sub scanning cross-section of the lens surface in the direction corresponding to the main scanning direction is a curve which is different from the above-mentioned arc shape in the deflected plane, can be determined so as to increase toward a maximum value smoothly and continuously as the position moves away from the optical axis in the direction corresponding to the main scanning direction and so as to decrease smoothly and continuously as the position moves away from the optical axis beyond the maximum value position.

With the coordinate in the direction corresponding to the main scanning direction as $\eta$, and the radius of curvature as $r(\eta)$, when a position error in the main scanning direction $\Delta\eta$ exists at $r(\eta)$, the error of the radius or curvature at the position $\eta$ is $\{dr(\eta)/d\eta\}\Delta\eta$, and if $r(\eta)$ increases according to the increase of $\eta$, $\{dr(\eta)/d\eta\}$ always have the same sign, $\{dr(\eta)/d\eta\}\Delta\eta$ can be remarkably large. However, since the sign of $\{dr(\eta)/d\eta\}$ changes before and after the maximum value if $r(\eta)$ has a maximum value as in the preferred embodiments of the present invention, $\{dr(\eta)/d\eta\}\Delta\eta$ can be effectively small. Also, the second lens having the above curvature center line achieved by the above-described correction is symmetrical relative to an optical axis of the scanning image forming lens.

Therefore, the tolerance with respect to the assembling error or the second lens, which is provided at the side of the surface to be scanned, in the optical scanning apparatus, can be effectively eliminated.

According to another preferred embodiment of the present invention, a scanning image forming lens in an optical scanning apparatus for optically scanning a surface to be scanned at a constant velocity by deflecting a luminous flux formed as a linear image in a direction corresponding to a main scanning direction via an optical deflector having a deflecting reflective plane located near where the linear image is formed so as to transmit the deflected luminous flux through the scanning image forming lens and to condense the deflected luminous flux on the surface to be scanned as a light spot, includes a first lens located at a side of the optical deflector, the first lens being a positive meniscus lens with a concave surface facing toward the optical deflector and having a co-axial aspherical shape at both surfaces thereof, both surfaces of the first lens being shaped such that a radius of curvature decreases as the position moves away from the optical axis in the direction corresponding to the main scanning direction, and a second lens located at a side of the surface to be scanned, the second lens having a non-arc shape in the deflected plane at a surface thereof at a side of the optical deflector, and the lens surface having the non-arc shape being shaped such that a radius of curvature in a sub-scanning cross-section changes in a direction corresponding to the main scanning direction such that a curvature center line plotting a curvature center in the sub-scanning cross-section of the lens surface in the direction corresponding to the main scanning direction is a curve which is different from the non-arc shape in the deflected plane, and the non-arc shape in the deflected plane forming a smooth curve being concave facing toward the optical deflector at a portion of the second lens near the optical axis and convex facing toward the optical deflector at a peripheral portion of the second lens spaced from the optical axis.

In a further preferred embodiment of the present invention, an optical scanning apparatus for optically scanning a surface to be scanned at a constant velocity includes a light source for producing a luminous flux, a first optical lens system for forming the luminous flux into a linear image, an optical deflector for deflecting the luminous flux formed as the linear image in a direction corresponding to a main scanning direction, the optical deflector having a deflecting plane located near where the linear image is formed, a scanning image forming lens for transmitting and condensing the deflected luminous flux on a surface to be scanned as a light spot so that the surface to be scanned is scanned, wherein the scanning image forming lens includes a first lens located at a side of the optical deflector, the first lens being a positive meniscus lens with a concave surface facing toward the optical deflector and having a co-axial aspherical shape at both surfaces thereof, both surfaces of the first lens being shaped such that a radius of curvature decreases as the position moves away from the optical axis in the direction corresponding to the main scanning direction, and a second lens located at a side of the surface to be scanned, the second lens having a non-arc shape in the deflected plane at a surface of the second lens at a side of the optical deflector, the surface of the second lens having the non-arc shape being shaped such that a radius of curvature in a sub scanning cross-section changes in a direction corresponding to the main scanning direction such that a curvature center line plotting a curvature center in the sub scanning cross-section of the lens surface in the direction corresponding to the main scanning direction is a curve which is different from the non-arc shape in the deflected plane, and the non-arc shape in the deflected plane of the second lens defines a smooth curve which is concave facing toward the optical deflector at a portion of the second lens near the optical axis and convex facing toward the optical deflector at a peripheral portion of the second lens spaced from the optical axis.

An optical scanning apparatus of preferred embodiments of the present invention is constructed for optically scanning a surface to be scanned at a constant velocity by deflecting a luminous flux formed as a linear image in the direction corresponding to the main scanning direction by an optical deflector having a deflecting reflective plane in the vicinity of the linear image so as to collect the deflected luminous flux on the surface to be scanned as a light spot with a scanning image forming lens as described above.

When the luminous flux from the light source is coupled by a coupling lens, the coupled luminous flux can be a weak converging or weak diverging luminous flux. However, in the optical scanning apparatus of preferred embodiments of the present invention, the coupled luminous flux is preferably made to be a parallel luminous flux by the coupling lens and the parallel luminous flux can be formed as a linear image having a longitudinal dimension extending in the direction corresponding to the main scanning direction in the vicinity of the deflecting reflective plane by a linear image forming optical system.

Further, when a rotating polygon mirror is used as the optical deflector, each of the above two lens constituting the scanning image forming lens may be provided with a tilt angle or can be shifted in the direction corresponding to the main scanning direction in the deflected plane in order to eliminate the influence of sag.

Alternatively, the second lens provided at the side of the surface to be scanned has a non-arc shape in the deflected plane at the surface at the side of the surface to be scanned, and the non-arc surface is shaped such that the radius of curvature in the sub scanning cross-section changes in the direction corresponding to the main scanning direction in a manner such that the curvature center line plotting the curvature center in the sub scanning cross-section of the lens surface in the direction corresponding to the main scanning direction is a curve different from the above-mentioned non-arc shape in the deflected plane.

In this case, the lens surface of the second lens at the side of the optical deflector can have an arc shape in the deflected plane.

Further, the second lens at the surface to be scanned side can have a negative refractive power in the deflected plane.

Furthermore, the above change in the radius of curvature of the lens surface of the second lens at the side of the surface to be scanned in the sub scanning cross-section may be determined such that the absolute value of the radius of curvature increases toward a maximum value smoothly and continuously as the position moves away from the optical axis in the direction corresponding to the main scanning direction and so as to decrease smoothly and continuously as the position moves away from the optical axis beyond the maximum value position.

Other novel characteristics, features and advantages of the preferred embodiments of the present invention will become apparent from the detailed description of preferred embodiments of the present invention and the illustrations of the preferred embodiments in the drawings described below.

DETAILED DESCRIPTION OF PREFERRED EMBODIMENTS

Figure 1:
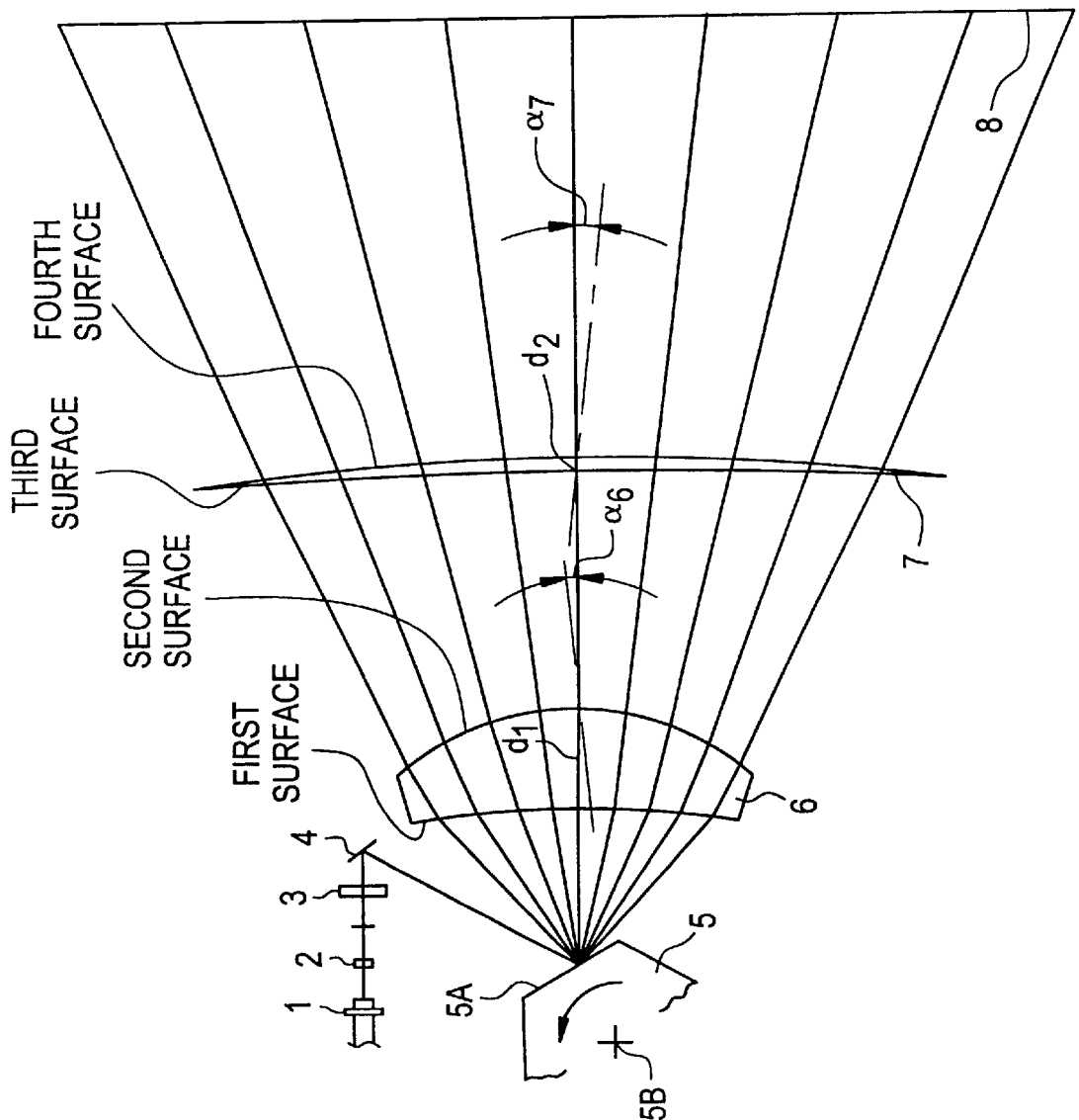
FIG. 1 is a diagram illustrating a preferred embodiment of an optial scanning apparatus of the present invention.

FIG. 1 schematically shows a preferred embodiment of an optical scanning apparatus according to the present invention.

A laser luminous flux is output from a light source 1. The light source 1 may preferably include a single semiconductor laser or a plurality of semiconductor lasers which form a multi-beam light source. The luminous flux output from the light source 1 is coupled by a coupling lens 2 and then collected only in the direction corresponding to the sub scanning direction (the direction perpendicular to the drawing) by a cylinder lens 3 and reflected by a mirror 4 so as to form a linear image in the direction corresponding to the main scanning direction (the direction parallel to the drawing) at a position in the vicinity of the deflecting reflective plane 5A of an optical deflector 5. In this preferred embodiment, the laser luminous flux coupled by the coupling lens 2 becomes a parallel luminous flux. The mirror 4 can be omitted depending upon the layout of the optical system from the light source 1 to the deflecting reflective plane 5, and the cylinder lens 3 can be replaced by a concave cylinder mirror, if desirable.

In this preferred embodiment, the optical deflector 5 is preferably a rotating polygon mirror having a rotation axis 5B that is spaced from the deflecting reflective plane 5A, such that displacement of the deflecting reflective plane 5A and the image forming position of the linear image according to the rotation of the deflecting reflective plane 5A causes a so-called "sag" condition.

The luminous flux reflected by the deflecting reflective plane 5A is deflected at a constant angular velocity according to the constant velocity rotation of the deflecting reflective plane 5 so as to pass through lenses 6, 7 as a deflected luminous flux. The lenses 6, 7 constitute a scanning image forming lens of the present preferred embodiment of the present invention.

The deflected luminous flux which passes through the scanning image forming lens constituted by lens 6 and lens 7 is collected on a surface to be scanned 8 so as to scan the surface to be scanned 8 at a constant velocity by a light spot formed on the surface to be scanned 8. Since a photoconductive photosensitive member is provided at the position of the surface to be scanned 8, the light spot substantially scans the photosensitive member optically.

Among the two lenses 6, 7 constituting the scanning image forming lens, the lens 6 located at the optical deflector 5 side is a positive meniscus lens with the concave surface facing to the optical deflector side and having a co-axial aspherical shape at both surfaces.

The lens 7 provided at the side of the surface to be scanned 8 is symmetrical relative to an optical axis of the lens 7 and the optical path or axis of the scanning image forming lens. The lens 7 has a non-arc shape at the optical deflector side lens surface (the third surface) in the deflected plane. The non-arc shaped surface of the lens 7 is formed such that the radius of curvature in the sub scanning cross-section changes in the direction corresponding to the main scanning direction in a manner such that the curvature center line plotting the curvature center in the sub scanning cross-section of the lens surface in the direction corresponding to the main scanning direction is a curve different from the above-mentioned non-arc shape in the deflected plane.

The shape of the optical deflector side surface of the lens 7 will be explained with reference to FIGS. 2A and 2B.

As later described, the lenses 6, 7 may be provided with a tilt angle in the deflected plane, however, in the explanation referring to FIGS. 2A and 2B, the state with the tilt angle of 0 will be described. Here, both a direction corresponding to the main scanning direction and a direction corresponding to the sub scanning direction are substantially perpendicular to the optical axis of the lens 7.

Figure 2A:
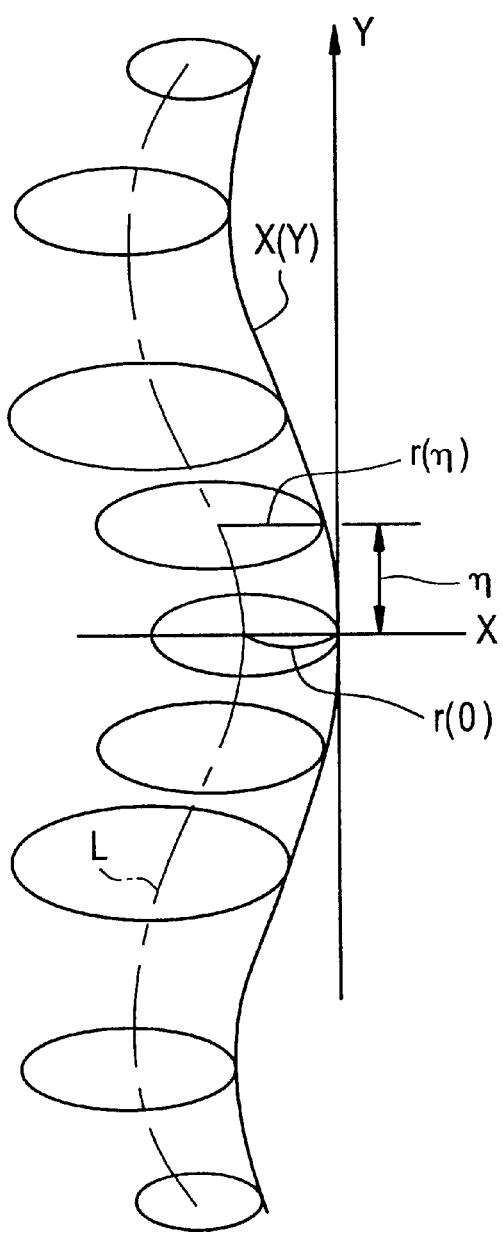
FIG. 2A is a graph for explaining the lens surface shape of a lens at the side of a surface to be scanned.
Figure 2B:
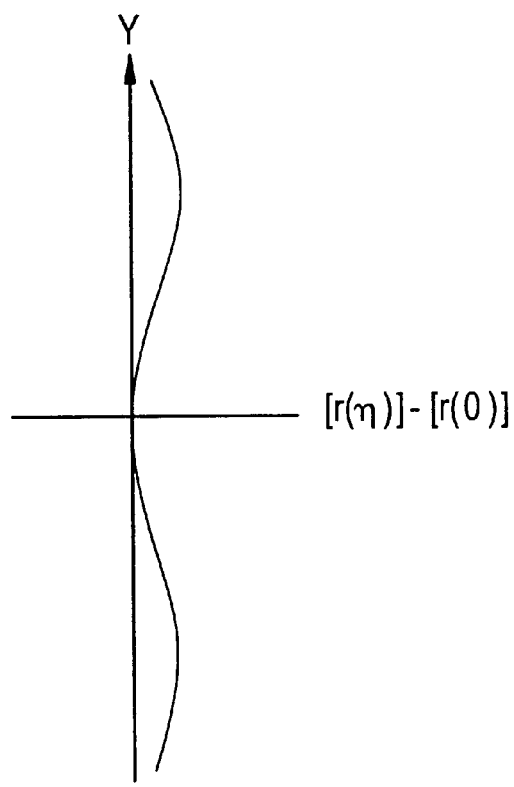
FIG. 2B is a graph for explaining the lens surface shape of a lens at the side of a surface to be scanned.

In FIGS. 2A and 2B, the Y axis represents the direction corresponding to the main scanning direction. The X axis represents the optical axis direction of the lens 7. The positive side of the X axis (the right side in the drawings) is the optical deflector side. The XY surface is the deflected plane.

In FIG. 2A, X(Y) is the surface shape of the lens 7 in the deflected plane, which is a non-arc shape. In FIG. 2A, $r(\eta)$ is the radius of curvature in the sub scanning cross-section at the position coordinate $\eta$ in the direction corresponding to the main scanning direction (Y direction). As seen in FIG. 2A, the radius of curvature $r(\eta)$ changes according to the position coordinate $\eta$. The curvature center line L formed by plotting the curvature center in the sub scanning cross-section at the position η is a curved line different from the non-arc shape X(Y) in the deflected plane. The surface as described above is herein called a special toric surface.

FIG. 2B shows how the absolute value of the radius of curvature difference in the sub scanning cross-section between the position η=0 and an optional position η, that is, |r(η)|−|r(0)|, changes in the direction corresponding to the main scanning direction.

The surface of the lens 7 at the side of the surface to be scanned 8 is an arc shape in the deflected plane. The lens 7 as a negative refractive power in the deflected plane.

As shown in FIG. 1, the lenses 6, 7 may be provided with tilt angles $\alpha_6$, $\alpha_7$, respectively, in the deflected plane for effectively eliminating the influence of sag.

Accordingly, the preferred embodiment shown in FIG. 1 is an optical scanning apparatus for optically scanning the surface to be scanned 8 at a constant velocity by deflecting a luminous flux formed as a linear image in the direction corresponding to the main scanning direction by the optical deflector 5 having the deflecting reflective plane 5A in the vicinity of the position where the linear image is formed so as to collect the deflected luminous flux on the surface to be scanned 8 as a light spot with the scanning image forming lenses 6, 7, wherein the luminous flux from the light source 1 is coupled by the coupling lens 2 as a parallel luminous flux and the parallel luminous flux is formed as a linear image having a longitudinal dimension extending in the direction corresponding to the main scanning direction in the vicinity of the deflecting reflective plane 5A by a cylinder lens 3 as a linear image forming optical system. The optical deflector 5 is a rotating polygon mirror and the lenses 6, 7 may preferably be provided with tilt angles $\alpha_6$, $\alpha_7$, respectively, in the deflected plane for eliminating the influence of sag.

Further, the scanning image forming lens is a scanning image forming lens in the above-mentioned optical scanning apparatus which includes the two lenses 6, 7. The lens 6 provided at the optical deflector 5 side is a positive meniscus lens with the concave surface facing to the optical deflector side, having a co-axial aspherical shape at both sides. The lens 7 provided at the side of the surface to be scanned 8 is symmetrical relative to an optical axis of the lens 7 and has a non-arc shape in the deflected plane at least at one side (X(Y) in FIG. 2A) thereof, and the radius of curvature in the sub scanning cross-section changes in the direction corresponding to the main scanning direction such that the curvature center line (L in FIG. 2A) plotting the curvature center in the sub scanning cross-section of the lens surface in the direction corresponding to the main scanning direction is a curve different from the non-arc shape (X(Y)) in the deflected plane.

Further, the lens surface of the lens 7 at the side of the surface to be scanned 8 has an arc shape in the deflected plane, and the lens 7 has a negative refractive power in the deflected plane.

The absolute value of the above-mentioned radius of curvature in the sub scanning cross-section at the lens 7 surface at the optical deflector side |r(η)| is as shown in FIG. 2B, is determined to increase smoothly and continuously from a value of |r(0)| to the maximum value according to increasing distances between the position and the optical axis (X axis) in the direction corresponding to the main scanning direction (Y direction) and decrease smoothly and continuously as the distance between the position and the optical axis beyond the maximum value position decreases.

Figure 3A:
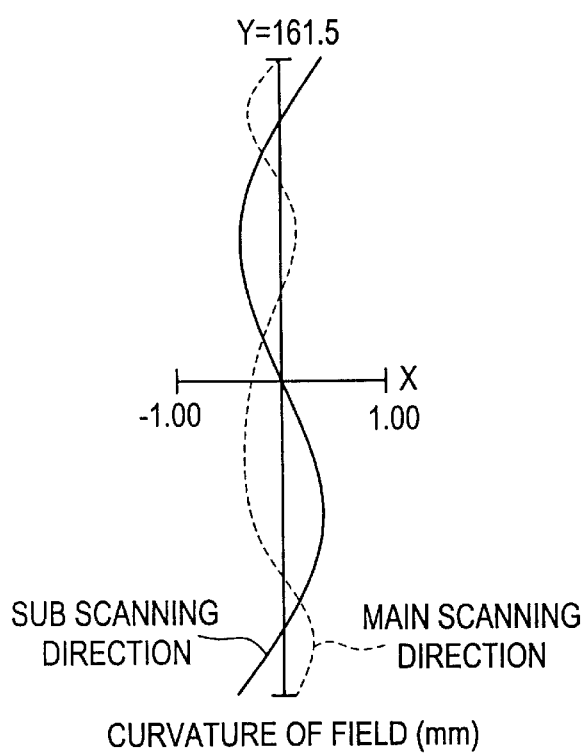
FIG. 3A is a graph for explaining the curvature of field of the preferred embodiment of FIG. 1.
Figure 3B:
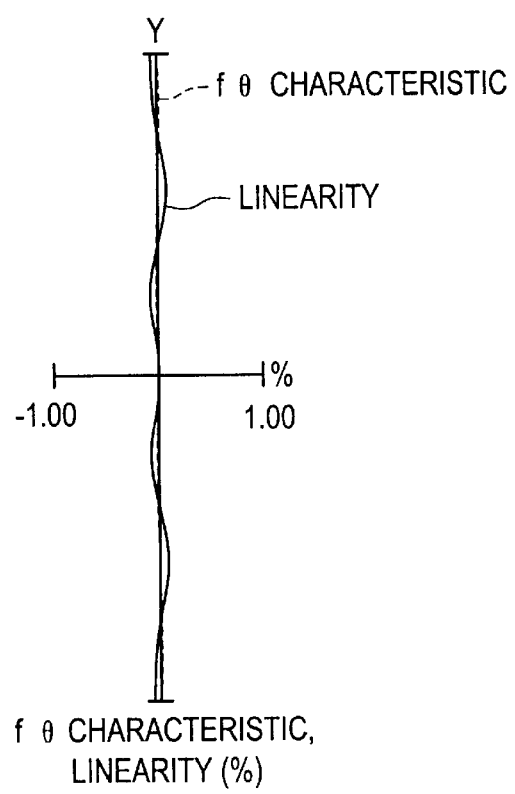
FIG. 3B is a graph for explaining the constant velocity characteristic of the preferred embodiment of FIG. 1.
Figure 4:
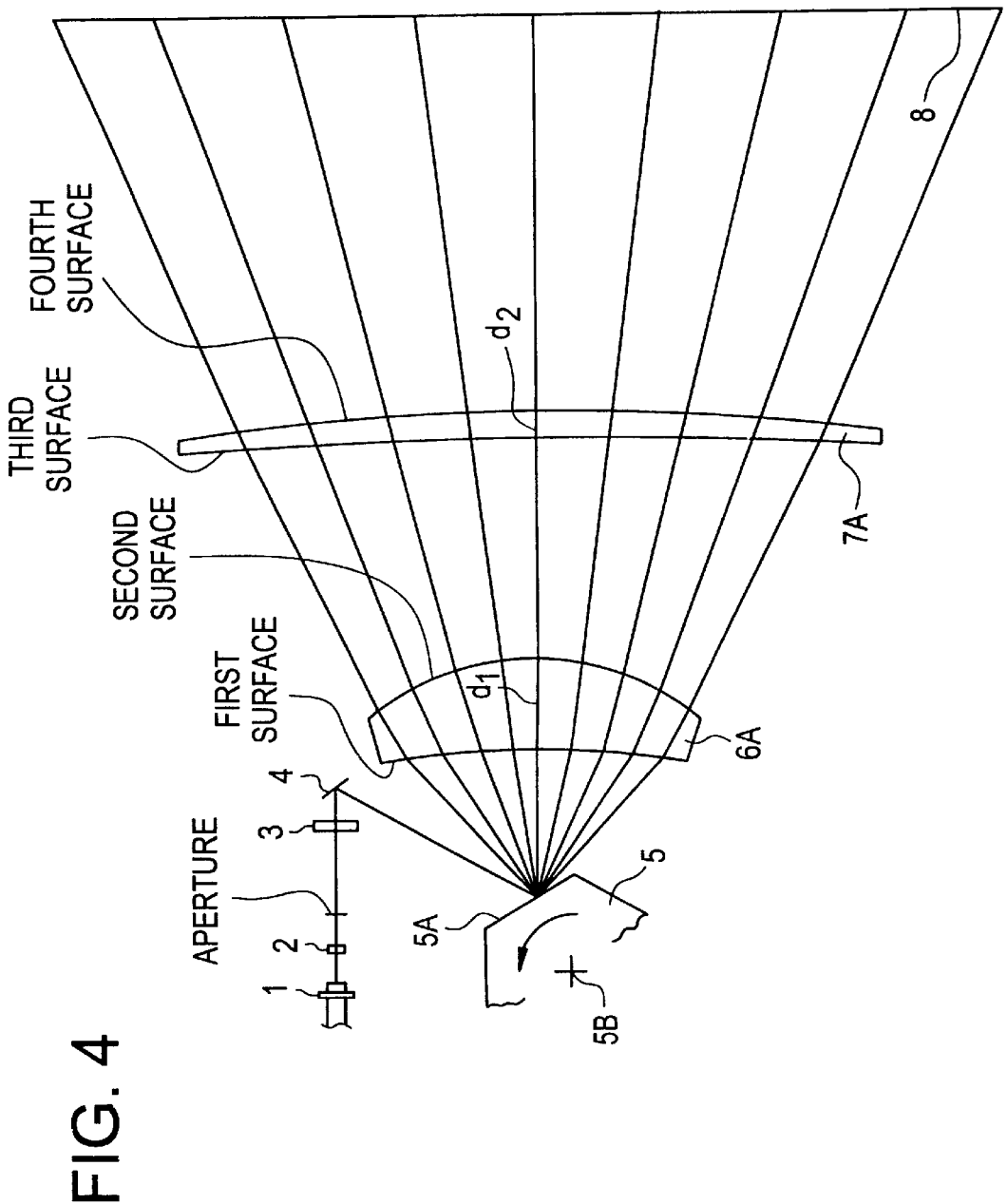
FIG. 4 is a diagram illustrating another preferred embodiment of an optical scanning apparatus of the present invention.
Figure 5A:
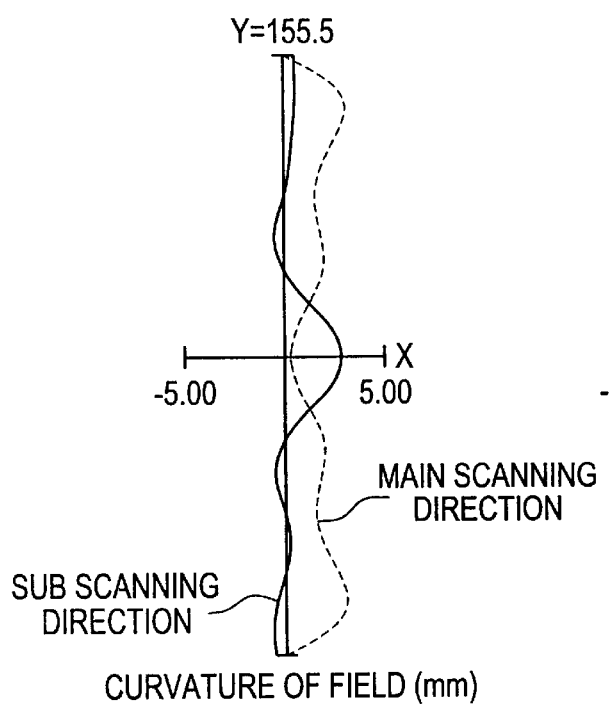
FIG. 5A is a graph for explaining the curvature of field of the preferred embodiment of FIG. 4.
Figure 5B:
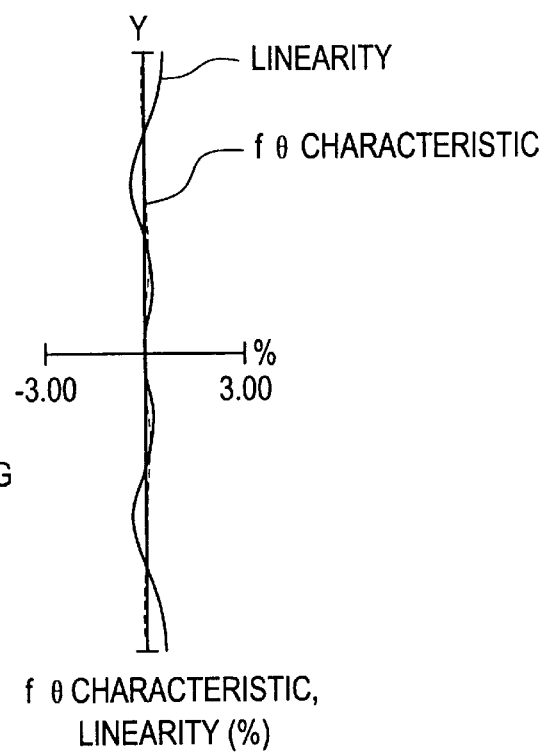
FIG. 5B is a graph for explaining the constant velocity characteristic of the preferred embodiment of FIG. 4.

FIG. 4 shows another preferred embodiment of an optical scanning apparatus according to the present invention. The portion of the preferred embodiment shown in FIG. 4 from the light source 1 to an optical deflector 5 or a rotating polygon mirror and a surface to be scanned 8 are similar to the previous preferred embodiment shown in FIG. 1. FIG. 5A and FIG. 5B correspond to FIGS. 3A and 3B and show a curvature of field and a fθ characteristic for the preferred embodiment shown in FIG. 4, respectively.

In the preferred embodiment shown in FIG. 4, the laser luminous flux coupled by the coupling lens 2 becomes a parallel luminous flux. However, the coupled laser flux may be formed as a weak converging or diverging flux. The mirror 4 can be omitted depending upon the layout of the optical system from the light source 1 to the deflecting reflective plane 5, and the cylinder lens 3 can be substituted by a concave cylinder mirror, if desired.

The luminous flux reflected by the deflecting reflective plane 5A is deflected at a constant angular velocity according to the constant velocity rotation of the deflecting reflective plane 5 so as to pass through lenses 6A, 7A as a deflected luminous flux. The lenses 6A, 7A constitute a scanning image forming lens of this preferred embodiment.

The deflected luminous flux which passes through the scanning image forming lens is collected at the surface to be scanned 8 so as to scan the surface to be scanned 8 at a constant velocity by a light spot formed on the surface to be scanned 8. Since a photoconductive photosensitive member is provided at the position of the surface to be scanned 8, the light spot substantially scans the photosensitive member optically.

Among the two lenses 6A, 7A constituting the scanning image forming lens, the lens 6A at the optical deflector 5 side is a positive meniscus lens with a concave surface facing toward the optical deflector side and has a co-axial aspherical surface at both sides.

The lens 7A provided at the side of the surface to be scanned 8 is symmetrical relative to an optical axis of the lens 7A and has a non-arc shape in the optical deflector side lens surface (the fourth surface), and the non-arc shaped surface is formed such that the radius of curvature in the sub scanning cross-section changes in the direction corresponding to the main scanning direction in a manner such that the curvature center line plotting the curvature center in the sub scanning cross-section of the lens surface in the direction corresponding to the main scanning direction is a curve different from the above-mentioned non-arc shape in the deflected plane. The surface is a special toric surface as explained above referring to FIG. 2A.

In this preferred embodiment, the lenses 6A, 7A are not provided with a tilt angle in the deflected plane. However, a tilt angle or shifting may be provided.

The surface of the lens 7A at the side of the optical deflector 5 is formed in an arc shape in the deflected plane. Further, the lens 7A has a negative refractive power in the deflected plane.

Accordingly, the preferred embodiment shown in FIG. 4 is an optical scanning apparatus for optically scanning the surface to be scanned 8 at a constant velocity by deflecting a luminous flux formed as a linear image in the direction corresponding to the main scanning direction by the optical deflector 5 having the deflecting reflective plane 5A in the vicinity of the position where the linear image is formed so as to collect the deflected luminous flux on the surface to be scanned 8 as a light spot with the scanning image forming lenses 6A, 7A, wherein the luminous flux from the light source 1 is coupled by the coupling lens 2 as a parallel luminous flux and the parallel luminous flux is formed as a linear image having a longitudinal dimension extending in the direction corresponding to the main scanning direction in the vicinity of the deflecting reflective plane 5A by a cylinder lens 3 of a linear image forming optical system.

Further, the scanning image forming lens is a scanning image forming lens in the above-mentioned optical scanning apparatus which includes the two lenses 6A, 7A. The lens 6A provided at the optical deflector 5 side is a positive meniscus lens with the concave surface facing to the optical deflector side, having a co-axial aspherical shape at both sides. The lens 7A provided at the side of the surface to be scanned 8 is symmetrical relative to the optical axis X of the lens 7A and has a non-arc shape in the deflected plane at least at one side (X(Y) in FIG. 2A), and the radius of curvature in the sub scanning cross-section changes in the direction corresponding to the main scanning direction such that the curvature center line (L in FIG. 2A) plotting the curvature center in the sub scanning cross-section of the lens surface in the direction corresponding to the main scanning direction is a curve different from the non-arc shape: X(Y) in the deflected plane.

Further, the lens surface of the lens 7A at the side of the optical deflector 5 has an arc shape in the deflected plane, and the lens 7A has a negative refractive power in the deflected plane.

The absolute value of the above-mentioned radius of curvature in the sub scanning cross-section at the lens 7A surface at the surface to be scanned side $|r(\eta)|$ as shown in FIG. 2B, increases smoothly and continuously from a value of $|r(0)|$ to a maximum value according to increasing distances between the position and the optical axis (X axis) in the direction corresponding to the main scanning direction (Y direction) and decreases smoothly and continuously as the position is located farther away from the optical axis beyond the maximum value position.

In FIG. 1, the surface to be scanned 8 is located closer to the first lens 6 and the second lens 7 than in conventional devices, while the size of the surface to be scanned 8 is kept the same. As a result, in the preferred embodiment shown in FIG. 1, the overall size of the apparatus shown in FIG. 1 is significantly reduced. However, an angle of scanning, which is an angle between the two outermost points of light impinging on the first lens 6 and transmitted to the surface to be scanned 8, is greatly increased as compared to the arrangement when the surface to be scanned 8 is located farther away from the lenses 6, 7. The greatly increased angle of scanning is caused by the change in position of the surface to be scanned 8 and results from light being transmitted through both a central portion and edge portions of the first and second lenses 6, 7 and impinged on the surface to be scanned. In contrast to this, when the surface to be scanned 8 is located far from the lenses 6, 7, only light which is transmitted through the central portion of the lenses 6, 7 is impinged on the surface to be scanned 8.

In the preferred embodiment with the surface to be scanned 8 located close to the lenses 6, 7, the light transmitted through the outer edge portions of the first lens 6 has a relatively high incident angle of light impinging on the first surface of the first lens 6. In contrast, the light impinged on the central portion of the first surface of the first lens 6 has a much lower incident angle of light and has very few aberrations. The large incident angle of light impinged on the outer edge portions of the first surface of the first lens 6 causes many aberrations in the image produced on the surface to be scanned 8.

To solve this problem, the lens surface at the edges of the first lens 6 on either side of the central portion of the first leas 6, is bent or twisted so as to decrease the radius of curvature at the edge portions of the first lens 6. The reduced radius of curvature of the first surface of the first lens 6 reduces the incident angle of impingement of light on outer edge portions of the first surface of the first lens 6.

Although the twisting of the edge portions of first surface of the first lens 6 solves the problems of the high incident angle of light which is impinged on the outer edge portions of the first surface of the first lens 6, this creates other aberrations in the image produced on the surface to be scanned 8, which aberrations occur as a result of light being transmitted through the edge portions of the first surface of the first lens 6 which have been twisted. More specifically, the twisted edge portions of the first surface of the first lens 6 cause the f$\theta$ characteristics and the linearity to be so poor that a required constant velocity function cannot be achieved.

To correct the aberrations created by the twisted edges of the first surface of the first lens 6, the third lens surface of the apparatus of FIG. 1 corresponding to the first surface in the deflected plane of the second lens 7 located at the side of the optical deflector 5, is configured to define a smooth curved line which is concave facing the optical deflector 5 at a portion of the third lens surface located near the optical axis and which is convex facing toward the optical deflector 5 at a peripheral portion of the third lens surface spaced from the optical axis. This configuration of the third lens surface (the first surface of the second lens 7) effectively corrects for a deficiency in the constant velocity function at the peripheral portion of the second lens 7 at the side of the optical deflector 5 via the portion of the third lens surface which is convex facing toward the optical deflector 5 at the peripheral portion of the second lens 7 at the side of the optical deflector 5.

The other surface of the lens 7 of this preferred embodiment, i.e. the fourth surface or the surface of the second lens 7 at the surface to be scanned 8 has an arc shape in the deflected plane as described with respect to the preferred embodiments shown in FIGS. 1–3. Despite this arc shape of the surface of the second lens 7 located at the side of the surface to be scanned, the second lens 7 may be configured such that the curvature center line plotting a curvature center in a sub scanning cross-section of the lens surface of the second lens at the side of the optical deflector and the lens surface in the deflected plane of the second lens at the side of the surface to be scanned can be configured so as to be respectively symmetrical relative to the optical axis. By configuring the lens surfaces of the second lens 7 in this manner, the lens surface at the side of the surface to be scanned is symmetrical relative to the optical axis. Also, as seen in FIG. 2A, the line X(Y) and the line L are symmetrical relative to each other. As a result, manufacturing of the lens 7 or manufacturing of a die for molding the lens when the lens is made by molding is much easier.

Examples of the preferred embodiments shown in FIGS. 1 and 4 will be explained herein below.

The first example is an example of the preferred embodiment shown in FIG. 1. A semiconductor laser 1 having the emission wavelength of about 670 nm was used as the light source. A rotating polygon mirror having six deflecting reflective planes and an approximately 25 mm inscribed circle radius of the deflecting reflective planes was used as the optical deflector 5. The angle formed by the luminous flux incident from the side of the mirror 4 for bending the optical path to the optical deflector 5 (the tilt angle: $\alpha_6=\alpha_7=0$) and the optical axis of the lenses 6, 7 of the scanning image forming optical system was about 60 degrees. The angle of field of the lens 6 is ±42 degrees.

The optical system on the optical path extending from the semiconductor laser 1 to the optical deflector 5 is defined to be a first group, and the optical system on the optical path extending from the optical deflector 5 to the surface to be scanned 8 is defined to be a second group.

The radius of curvature of the cover glass of the semiconductor laser 1, the deflecting reflective plane, and the lens surface of each lens (the paraxial radius of curvature for those not having an arc shape) is represented by Rm in the direction corresponding to the main scanning direction and Rs in the direction corresponding to the sub scanning direction. The distance along the optical axis is represented by DL, and the refractive index of the material is represented by N. An amount having the length dimension is represented by the "mm" unit.

The first group data is as follows:

| Surface number | Rm | Rs | DL | N | |
|---|---|---|---|---|---|
| 0 | | | 0.50 | | Emission part |
| 1 | ∞ | ∞ | 0.30 | 1.514 | Cover glass |
| 2 | ∞ | ∞ | 10.00 | | |
| 3 | ∞ | ∞ | 2.80 | 1.681 | Coupling lens |
| 4 | — | — | 20.00 | | |
|   | 8.414 | 8.414 | | | |
| 5 | ∞ | 48.00 | 3.00 | 1.514 | Cylindrical lens |
| 6 | ∞ | ∞ | 91.4 | | |

DL=91.4 is the distance from the output side surface of the cylindrical lens to the deflecting reflective plane (image forming position of the linear image) of the optical deflector.

The output side surface of the coupling lens (the above-mentioned surface number: 4) is a co-axial aspherical surface, and the coupled luminous flux becomes a substantially parallel luminous flux.

The co-axial aspherical surface has the following values in the above-mentioned formula (1) for the paraxial radius of curvature: R (=Rm=Rs), the cone constant: K, and the fourth, sixth, eighth and tenth aspherical coefficients with respect to Y; A, B, C, D;

R=−8.414, K=−0.021, A=1.23E−4, B=1.36E−6,
C=1.24E−8, D=1.54E−10.

The expression such as "E−4" represents an exponent. For example, "E−4" represents "$10^{-4}$", and the exponential value is to be multiplied by the value located immediately preceding it.

In the second group, "α" represents the above-mentioned tilt angle and an angle formed in the clockwise direction is defined as a "positive" angle and is expressed with the unit of "degree".

The second group data is as follows:

| Surface number | Rm | Rs | DL | N | α | |
|---|---|---|---|---|---|---|
| 0 | ∞ | ∞ | 52.71 | | — | Deflecting reflective plane |
| 1 | −312.6 | −312.6 | 31.40 | 1.527 | −0.04 | Lens 6 |
| 2 | −82.95 | −82.95 | 78.0 | | | |

-continued

| Surface number | Rm | Rs | DL | N | α | |
|---|---|---|---|---|---|---|
| 3 | −500.0 | −47.85 | 3.50 | 1.527 | +0.26 | Lens 7 |
| 4 | −700.0 | −23.38 | | | | |

DL=52.71 is the distance from the deflecting reflective plane to the incident side surface of the lens 6.

Both sides of the lens 6 (the above-mentioned surface numbers 1, 2) have a co-axial aspherical surface, and the output side surface of the lens 7 (the above-mentioned surface number 4) is a normal toroidal surface.

The incident side surface of the lens 6 has the following values in the above-mentioned formula (1) for the paraxial radius of curvature: R (=Rm=Rs), the cone constant: K, and the fourth, sixth, eighth and tenth aspherical coefficients with respect to Y: A, B, C, D;

R=−312.6, K=2.667, A=1.79E−7, B=1.08E−12,
C=−3.18E−14, D=3.74E−18.

The output side surface of the lens 6 has the following values in the above-mentioned formula (1) for the paraxial radius of curvature: R (=Rm=Rs), the cone constant: K, and the fourth, sixth, eighth and tenth aspherical coefficients with respect to Y; A, B, C, D;

R=−82.95, K=0.02, A=2.50E−7, B=9.61E−12,
C=4.54E−15, D=−3.03E−18.

The incident side surface of the lens has a non-arc shape in the deflected plane. In the state with the above-mentioned tilt angle $\alpha_7=0$, the curvature in the sub scanning cross-section: Cs(Y) can be specified by providing Rs(0), cj in Cs(Y) = $\{1/Rs(0)\}+\Sigma c_j \cdot Y^{**}j$ (j=1, 2, 3, . . . ) (2). The radius of curvature in the sub scanning cross-section at the position in the direction corresponding to the main scanning direction Y is "1/Cs(Y)".

The above non-arc shape of the incident side surface of the lens is expressed by the above-mentioned formula (1) and the paraxial radius of curvature: R (=Rm=Rs), the cone constant: K, and the fourth, sixth, eighth and tenth aspherical coefficients with respect to Y: A, B, C, D have the following values;

R=−500.00, K=−71.73, A=4.33E−8, B=−5.97E−13,
C=−1.28E−16, D=5.73E−21.

Rs(0), cj in the above-mentioned formula (2) have the following values.

Rs(0) (=R)=−47.85, $b_2$=1.59E−3, $b_4$=−2.32E−7,
$b_6$=6.60E−11, $b_8$=−5.61E−16, $b_{10}$=2.18E−20, $b_{12}$=−1.25E−24.

All of the coefficients of Y in the odd number order are 0. Therefore, the formula (2) concerning the incident side surface of the lens 7 is symmetrical with respect to the optical axis in the Y direction.

Based on "Cs(Y)" accordingly determined, the absolute value of the radius of curvature was calculated. The absolute value changes so as to increase toward the maximum value smoothly and continuously as the position moves away from the optical axis in the direction corresponding to the maim scanning direction and so as to decrease smoothly and continuously as the position moves away from the optical axis beyond the maximum value position as shown in FIG. 2B.

As heretofore mentioned, since the output side surface of the lens 7 is a normal toroidal surface, the position of all elements in the optical system including the scanning image forming lens was determined.

FIGS. 3A and 3B are graphs for explaining the curvature of field and the constant velocity characteristic of the above example of the preferred embodiment. In the curvature of field graph shown in FIG. 3A, the broken line represents the curvature of field in the direction corresponding to the main scanning direction, and the solid line represents the curvature of field in the sub scanning direction. The absolute value of the curvatures of field in the main and sub scanning directions is about 1 mm or less, which is excellent. In FIG. 3B, the broken line represents the fe characteristic, and the solid line represents the "linearity".

In these drawings, "Y" in the vertical axis does not represent the coordinate in the direction corresponding to the main scanning direction but the image height of the light spot. The curvature of field and the constant velocity characteristic are not symmetrical at the plus side and the minus side of the image height of the light spot. This is due to the influence of the above-mentioned sag. With the above-mentioned tilt angles $\alpha_6$, $\alpha_7$=0, the asymmetric feature of the curvature of field and the constant velocity characteristic become more remarkable such that the curvature of field and the constant velocity characteristic deteriorate at the plus side or the minus side of the image height of the light spot. However, as mentioned above, since a tilt angle is provided, both curvature of field and constant velocity characteristic are accurately and completely corrected at the plus side and the minus side of the image height of the light spot.

As described above, the scanning image forming lens in the first example of the preferred embodiments includes two lenses. The first lens located at a side of the optical deflector is a positive meniscus lens with a concave surface facing to the optical deflector and has a co-axial aspherical shape at both surfaces thereof. Both surfaces of the first lens are shaped such that a radius of curvature decreases as the position moves away from the optical axis in the direction corresponding to the main scanning direction. The second lens located at a side of the surface to be scanned has a non-arc shape in the deflected plane at a surface thereof at a side of the optical deflector, and the lens surface having the non-arc shape is shaped such that a radius of curvature in the sub-scanning cross-section changes in a direction corresponding to the main scanning direction such that a curvature center line plotting a curvature center in the sub-scanning cross-section of the lens surface in the direction corresponding to the main scanning direction is a curve which is different from the non-arc shape in the deflected plane, and the non-arc shape in the deflected plane of the second lens forms a smooth curved line which is concave facing toward the optical deflector at a portion of the lens surface of the second lens near the optical axis and convex facing toward the optical deflector at a peripheral portion of the lens surface far from the optical axis. Further the surface of the second lens located at the side of the surface to be scanned has an arc shape in the deflected plane, and the second lens has a negative refractive power in the deflected plane. An absolute value of the radius of curvature of the lens surface of the second lens having the non-arc shape in the deflected plane increases toward a maximum value as the position moves away from the optical axis in the direction corresponding to the main scanning direction and decreases as the position moves away from the optical axis beyond the maximum value position. In addition, the non-arc shape in the deflected plane of the lens surface of the second lens at the side of the optical deflector, the curvature center line plotting the curvature center in the sub-scanning cross-section of the lens surface of the second lens at the side of the optical deflector and the lens surface in the deflected plane of the second lens at the side of the surface to be scanned are respectively symmetrical relative to the optical axis. The optical deflector has a rotation center located spaced from the deflecting reflective surface and each of the first and second lenses has a tilt angle in the deflected plane for compensating an influence of sag in the optical deflector.

The second example is an example of the preferred embodiment shown in FIG. 4. A semiconductor laser 1 having the emission wavelength of about 655 nm was used as the light source. A rotating polygon mirror having five deflecting reflective planes and an approximately 13 mm inscribed circle radius of the deflecting reflective planes was used as the optical deflector 5. The angle formed by the luminous flux incident from the side of the mirror 4 for bending the optical path to the optical deflector 5 and the optical axis of the lenses 6A, 7A of the scanning image forming optical system was about 60 degrees. The angle of field of the lens is ±42 degrees.

The optical system on the optical path elongating from the semiconductor laser 1 to the optical deflector 5 is defined to be the first group, and the optical system on the optical path elongating from the optical deflector 5 to the surface to be scanned 8 is defined to be the second group.

The radius of curvature of the cover glass of the semiconductor laser 1, the deflecting reflective plane, and the lens surface of each lens (the paraxial radius of curvature for those not having an arc shape) is represented by Rm in the direction corresponding to the main scanning direction and Rs in the direction corresponding to the sub scanning direction. The distance along the optical axis is represented by DL, and the refractive index of the material is represented by N. An amount having the length dimension is represented by the "mm" unit.

The first group data is as follows:

| Surface number | Rm | Rs | DL | N | |
|---|---|---|---|---|---|
| 0 | | | 0.50 | | Emission part |
| 1 | ∞ | ∞ | 0.30 | 1.514 | Cover glass |
| 2 | ∞ | ∞ | 12.00 | | |
| 3 | 52.583 | 52.583 | 3.80 | 1.514 | Coupling lens |
| 4 | −8.71 | −8.71 | 38.04 | | |
| 5 | ∞ | 48.00 | 3.00 | 1.514 | Cylindrical lens |
| 6 | ∞ | ∞ | 91.3 | | |

DL=91.3 is the distance from the output side surface of the cylindrical lens to the deflecting reflective plane (image forming position of the linear image) of the optical deflector.

Both surfaces of the coupling lens (the above-mentioned surface numbers: 3, 4) have a co-axial aspherical surface, and the coupled luminous flux becomes a substantially parallel luminous flux.

The co-axial aspherical surface has the following values in the above-mentioned formula (1) for the paraxial radius of curvature: R (=Rm=Rs), the cone constant: K, and the fourth, sixth, eighth and tenth aspherical coefficients with respect to Y: A, B, C, D;

The incident side surface of the coupling lens:
R=52.583, K=157.686, A=−1.80E−4, B=−4.13E−6, C=2.34E−7, D=−3.59E−8.

The output side surface of the coupling lens:
R=−8.71, K=−0.31, A=5.92E−5, B=2.50E−7, C=1.20E−7, D=−5.63E−9.

The second group data is as follows;

| Surface number | Rm | Rs | DL | N | α | |
|---|---|---|---|---|---|---|
| 0 | ∞ | ∞ | 52.35 | — | | Deflecting reflective plane |
| 1 | −312.6 | −312.6 | 31.40 | 1.527 | −0.04 | Lens 6 |
| 2 | −82.95 | −82.95 | 78.0 | | | |
| 3 | −550.0 | −44.00 | 8.00 | 1.527 | +0.26 | Lens 7 |
| 4 | −1000 | −23.38 | | | | |

DL=52.35 is the distance from the deflecting reflective plane to the incident side surface of the lens 6.

Both sides of the lens 6A (the above-mentioned surface numbers 1, 2) have a co-axial aspherical surface, and the incident side surface of the lens 7 (the above-mentioned surface number 3) is a normal toroidal surface. That is, the lens surface with the surface number 3 is in a shape of an arc.

The incident side surface of the lens 6A has the following values in the above-mentioned formula (1) for the paraxial radius of curvature: R (=Rm=Rs), the cone constant: K, and the fourth, sixth, eighth and tenth aspherical coefficients with respect to Y: A, B, C, D;

R=−312.6, K=2.667, A=1.79E−7, B=1.08E−12,
C=−3.18E−14, D=3.74E−18.

The output side surface of the lens 6A has the following values in the above-mentioned formula (1) for the paraxial radius of curvature: R (=Rm=Rs), the cone constant: K, and the fourth, sixth, eighth and tenth aspherical coefficients with respect to Y: A, B, C, D;

R=−82.95, K=0.02, A=2.50E−7, B=9.61E−12,
C=4.54E−15, D=−3.03E−18.

The output side surface of the lens 7A is a non-arc shape in the deflected plane. The curvature in the sub scanning cross-section: Cs(Y) can be specified by providing Rs(0), cj in the formula: $Cs(Y)=\{1/Rs(0)\}+\Sigma c_j \cdot Y^{**j}$ (j=1, 2, 3, ... ) (2). The radius of curvature in the sub scanning cross-section at the position in the direction corresponding to the main scanning direction Y is "1/Cs(Y)".

The above non-arc shape of the incident side surface of the lens is expressed by the above-mentioned formula (1) and the paraxial radius of curvature: R (=Rm=Rs), the cone constant; K, and the fourth, sixth, eighth and tenth aspherical coefficients with respect to Y: A, B, C, D have the following values;

R=−1000.00, K=25.81, A=−8.20E−8, B=1.11E−12,
C=2.22E−16, D=−1.00E−20.

Rs(0), cj in the above-mentioned formula (2) have the following values.

Rs(0) (=R)=−45.0, $b_2$=3.47E−6, $b_4$=−7.34E−8,
$b_6$=1.41E−11, $b_8$=−6.40E−16, $b_{10}$=3.71E−20,
$b_{12}$=−4.02E−24.

All of the coefficients of Y in the odd number order are 0. Therefore, the formula (2) concerning the incident side surface of the lens 7A is symmetrical with respect to the optical axis in the Y direction.

Based on "Cs(Y)" accordingly determined, the absolute value of the radius of curvature was calculated. The absolute value changes so as to increase toward the maximum value smoothly and continuously as the position moves away from the optical axis in the direction corresponding to the maim scanning direction and so as to decrease smoothly and continuously as the position moves away from the optical axis beyond the maximum value position as shown in FIG. 2B.

As heretofore mentioned, since the incident side surface of the lens 7A is a normal toroidal surface, the position of all elements in the optical system including the scanning image forming lens was determined.

FIGS. 5A and 5B are graphs for explaining the curvature of field and the constant velocity characteristic of the above example of the preferred embodiment. As shown in the drawings, both the curvature of field and the constant velocity characteristic are excellent.

As mentioned above, according to preferred embodiments of the present invention, a scanning image forming lens and an optical scanning apparatus are provided. Since the lens provided at the optical deflector side is a meniscus lens in the scanning image forming lens of the preferred embodiments of the present invention, uniform lens thickness can be achieved because a thickness difference between the center portion and the peripheral portion, particularly between the center portion and the peripheral portion in the direction corresponding to the main scanning direction, is eliminated. Therefore, deformation such as sinking and waving in the molding process with a resin such as plastic is effectively prevented. Further, since the lens at the optical deflector side is provided with the concave surface facing to the optical deflector side, any change in the distance from the deflection origin to the incident side lens surface between the center portion and the peripheral portion in the direction corresponding to the main scanning direction is small, and thus, the difference of the lateral magnification in the direction corresponding to the sub scanning direction between the center portion and the peripheral portion is small.

Since the scanning image forming lens has at least three surfaces having a non-arc shape in the deflected plane, the curvature of field and the constant velocity characteristic in the main scanning direction are corrected accurately and completely by providing an optimal non-arc shape. Since two surfaces (both sides of the lens provided at the optical deflector side) have a non-arc shape in the plane parallel to the optical axis and perpendicular to the deflected plane and the radius of curvature in the sub scanning cross-section is changed in the direction corresponding to the main scanning direction in at least one surface of the lens provided at the side of the surface to be scanned, the curvature of field in the sub scanning direction can be effectively corrected by providing an optimal radius of curvature change according to the non-arc shape optimized for the curvature of field and the constant velocity characteristic in the main scanning direction.

Further, since the lens at the surface to be scanned side has a negative refractive power in the deflected plane in the scanning image forming lens and the lens at the optical deflector side is a positive meniscus lens, the combination of the refractive power of the scanning image forming lens in the deflected plane is a combination of positive and negative powers, when each of the two lenses constituting the scanning image forming lens are plastic lenses, the influence of the temperature and humidity change can be offset by the lenses, and thus, the influence of the temperature and humidity change on the scanning image forming lens is minimized.

Since the absolute value of the radius of curvature of the lens surface of the lens provided at the side of the surface to be scanned, the lens surface having a non-arc shape in the deflected plane at least at one side, and the radius of curvature in the sub scanning cross-section changing in the direction corresponding to the main scanning direction such that the curvature center line plotting the curvature center in the sub scanning cross-section of the lens surface in the direction corresponding to the main scanning direction is a curve different from the above-mentioned arc shape in the deflected plane, can be determined so as to increase toward the maximum value smoothly and continuously as the position moves away from the optical axis in the direction corresponding to the main scanning direction and so as to decrease smoothly and continuously as the position moves away from the optical axis beyond the maximum value position and since this lens is symmetrical relative to an optical axis thereof in the scanning image forming lens according to preferred embodiments of the present invention, the tolerance with respect to the assembling error of the scanning image forming lens in the optical scanning apparatus can be effectively eliminated. As a result, if there is a positioning or assembling error upon installing the scanning image forming lens constructed according to preferred embodiments of the present invention in an optical scanning apparatus, the curvature of field, constant scanning velocity and the conjugating relationship are all excellent despite the positioning and assembling errors.

An optical scanning apparatus of preferred embodiments of the present invention achieves an optical scan with excellent curvature of field and constant velocity characteristics in the main and sub scanning directions by the use of a scanning image forming lens as mentioned above. Further, the optical scanning apparatus eliminates the influence of sag when a rotating polygon mirror is used as the optical deflector.

Numerous additional modifications and variations are possible in light of the above teachings. Therefore, it is to be understood that within the scope of the appended claims, the present invention may be practiced otherwise than as specifically described herein.

What is claimed is:

1. A scanning image forming lens in an optical scanning apparatus for optically scanning a surface to be scanned at a constant velocity by deflecting a luminous flux formed as a linear image in a direction corresponding to a main scanning direction via an optical deflector having a deflecting reflective plane located near where the linear image if formed so as to transmit the deflected luminous flux through the scanning image forming lens and to condense the deflected luminous flux on the surface to be scanned as a light spot, the scanning image forming lens comprising:

a first lens located at a side of the optical deflector, the first lens being a positive meniscus lens with a concave surface facing toward the optical deflector and having a co-axial aspherical shape at both surfaces thereof; and a second lens located at a side of the surface to be scanned, the second lens having an optical axis and being symmetrical relative to the optical axis, the second lens having a non-arc shape in the deflected plane at least at one surface of the second lens, and the at least one surface of the second lens having the non-arc shape being shaped such that a radius of curvature in a sub scanning cross-section changes in a direction corresponding to the main scanning direction such that a curvature center line plotting a curvature center in the sub scanning cross-section of the at least one lens surface in the direction corresponding to the main scanning direction is a curve which is different from the non-arc shape in the deflected plane, and at least one surface of the second lens has a concave shape in the sub scanning cross-section.

2. The scanning image forming lens according to claim 1, wherein the at least one lens surface of the second lens having the non-arc shape in the deflected plane faces the optical deflector.

3. The scanning image forming lens according to claim 2, wherein the surface of the second lens located at the side of the surface to be scanned has an arc shape in the deflected plane.

4. The scanning image forming lens according to claim 1, wherein the second lens has a negative refractive power in the deflected plane.

5. The scanning image forming lens according to claim 1, wherein an absolute value of the radius of curvature of the at least one lens surface of the second lens having the non-arc shape in the deflected plane increases toward a maximum value as the position moves away from the optical axis in the direction corresponding to the main scanning direction and decreases as the position moves away from the optical axis beyond the maximum value position.

6. The scanning image forming lens according to claim 1, wherein both surfaces of the first lens are shaped such that a radius of curvature decreases as the position moves away from the optical axis in the direction corresponding to the main scanning direction.

7. The scanning image forming lens according to claim 1, wherein the non-arc shape in the deflected plane forms a smooth curve that is concave facing toward the optical deflector at a portion of the second lens near the optical axis and convex facing toward the optical deflector at a peripheral portion of the second lens spaced from the optical axis.

8. The scanning image forming lens according to claim 1, wherein each of the first and second lenses has a tilt angle in the deflected plane to eliminate an influence of sag in the optical deflector.

9. The scanning image forming lens according to claim 1, wherein the second lens is a meniscus lens.

10. The scanning image forming lens according to claim 1, wherein the first lens includes first and second lens surfaces and the second lens includes third and fourth lens surfaces with respect to a location relative to the optical deflector, the at least one surface of the second lens that has the concave shape is located at the third lens surface.

11. The scanning image forming lens according to claim 1, wherein the at least one surface of the second lens having the non-arc shape is the at least one surface having the concave shape in the sub scanning cross-section.

12. The scanning image forming lens according to claim 1, wherein the at least one surface of the second lens having the non-arc shape is located at the surface opposite to the at least one surface having the concave shape in the sub scanning cross-section.

13. The scanning image forming lens according to claim 1, wherein the at least one surface of the second lens having the non-arc shape is the surface of the second lens that is located closest to the optical deflector.

14. The scanning image forming lens according to claim 1, wherein the at least one surface of the second lens having the non-arc shape is the surface of the second lens that is located farthest from the optical deflector.

15. The scanning image forming lens according to claim 1, wherein the second lens is a meniscus lens and the at least one surface of the second lens having the non-arc shape is located at the convex surface of the meniscus lens.

16. An optical scanning apparatus for optically scanning a surface to be scanned at a constant velocity, the optical scanning apparatus comprising:

a light source for producing a luminous flux;

a first optical lens system for forming the luminous flux into a linear image;

an optical deflector for deflecting the luminous flux formed as the linear image in a direction corresponding to a main scanning direction, the optical deflector having a deflecting plane located near where the linear image is formed;

a scanning image forming lens for transmitting and condensing the deflected luminous flux on a surface to be scanned as a light spot so that the surface to be scanned is scanned; wherein the scanning image forming lens includes a first lens located at a side of the optical deflector, the first lens being a positive meniscus lens with a concave surface facing toward the optical deflector and having a co-axial aspherical shape at both surfaces thereof, and a second lens located at a side of the scanning surface, the second lens having an optical axis and being symmetrical relative to the optical axis, the second lens having a non-arc shape in the deflected plane at least at one surface of the second lens, and the at least one surface of the second lens having the non-arc shape being shaped such that a radius of curvature in a sub scanning cross-section changes in a direction corresponding to the main scanning direction such that a curvature center line plotting a curvature center in the sub scanning cross-section of the at least one lens surface in the direction corresponding to the main scanning direction is a curve which is different from the non-arc shape in the deflected plane, and at least one surface of the second lens has a concave shape in the sub scanning cross-section.

17. The optical scanning apparatus according to claim 16, wherein the light source comprises a multi-beam light source.

18. The optical scanning apparatus according to claim 16, wherein the at least one lens surface of the second lens having the non-arc shape in the deflected plane faces the optical deflector.

19. The optical scanning apparatus according to claim 18, wherein the surface of the second lens at the side of the scanning surface to be scanned has an arc shape in the deflected plane.

20. The optical scanning apparatus according to claim 16, wherein the second lens has a negative refractive power in the deflected plane.

21. The optical scanning apparatus according to claim 16, wherein an absolute value of the radius of curvature of the at least one lens surface of the second lens having the non-arc shape in the deflected plane increases toward a maximum value as the position moves away from the optical axis in the direction corresponding to the main scanning direction and decreases as the position moves away from the optical axis beyond the maximum value position.

22. The optical scanning apparatus according to claim 16, further comprising a coupling lens, wherein the luminous flux from the light source is coupled via the coupling lens so as to be a parallel luminous flux.

23. The optical scanning apparatus according to claim 16, wherein each of the first and second lenses of the scanning image forming lens has a tilt angle in the deflected plane to eliminate an influence of sag in the optical deflector.

24. An image forming apparatus comprising:

a scanning image forming lens in an optical scanning apparatus for optically scanning a surface to be scanned at a constant velocity by deflecting a luminous flux formed as a linear image in a direction corresponding to a main scanning direction via an optical deflector having a deflecting reflective plane located near where the linear image if formed so as to transmit the deflected luminous flux through the scanning image forming lens and to condense the deflected luminous flux on the surface to be scanned as a light spot, the scanning image forming lens including:

a first lens located at a side of the optical deflector, the first lens being a positive meniscus lens with a concave surface facing toward the optical deflector and having a co-axial aspherical shape at both surfaces thereof; and a second lens located at a side of the surface to be scanned, the second lens having an optical axis and being symmetrical relative to the optical axis, the second lens having a non-arc shape in the deflected plane at least at one surface of the second lens, and the at least one surface of the second lens having the non-arc shape being shaped such that a radius of curvature in a sub scanning cross-section changes in a direction corresponding to the main scanning direction such that a curvature center line plotting a curvature center in the sub scanning cross-section of the at least one lens surface in the direction corresponding to the main scanning direction is a curve which is different from the non-arc shape in the deflected plane, and at least one surface of the second lens has a concave shape in the sub scanning cross-section.

25. A scanning image forming lens in an optical scanning apparatus for optically scanning a surface to be scanned at a constant velocity by deflecting a luminous flux formed as a linear image in a direction corresponding to a main scanning direction via an optical deflector having a deflecting reflective plane located near where the linear image is formed so as to transmit the deflected luminous flux through the scanning image forming lens and to condense the deflected luminous flux on the surface to be scanned as a light spot, the scanning image forming lens comprising:

a first lens located at a side of the optical deflector, the first lens being a positive meniscus lens with a concave surface facing toward the optical deflector and having a co-axial aspherical shape at both surfaces thereof, both surfaces of the first lens being shaped such that a radius of curvature decreases as the position moves away from the optical axis in the direction corresponding to the main scanning direction; and a second lens located at a side of the surface to be scanned, the second lens having a non-arc shape in the deflected plane at a surface thereof at a side of the optical deflector, and the lens surface having the non-arc shape being shaped such that a radius of curvature in a sub-scanning cross-section changes in a direction corresponding to the main scanning direction such that a curvature center line plotting a curvature center in the sub-scanning cross-section of the lens surface in the direction corresponding to the main scanning direction is a curve which is different from the non-arc shape in the deflected plane, and the non-arc shape in the deflected plane forming a smooth curve being concave facing toward the optical deflector at a portion of the second lens near the optical axis and convex facing toward the optical deflector at a peripheral portion of the second lens spaced from the optical axis.

26. The scanning image forming lens according to claim 25, wherein the at least one lens surface of the second lens having the non-arc shape in the deflected plane faces the optical deflector.

27. The scanning image forming lens according to claim 25, wherein the surface of the second lens located at the side of the surface to be scanned has an arc shape in the deflected plane.

28. The scanning image forming lens according to claim 25, wherein the second lens has a negative refractive power in the deflected plane.

29. The scanning image forming lens according to claim 25, wherein an absolute value of the radius of curvature of the lens surface of the second lens having the non-arc shape in the deflected plane increases toward a maximum value as the position moves away from the optical axis in the direction corresponding to the main scanning direction and decreases as the position moves away from the optical axis beyond the maximum value position.

30. The scanning image forming lens according to claim 25, wherein the non-arc shape in the deflected plane of the lens surface of the second lens at the side of the optical deflector, the curvature center line plotting the curvature center in the sub-scanning cross-section of the lens surface of the second lens at the side of the optical deflector and the lens surface in the deflected plane of the second lens at the side of the surface to be scanned are respectively symmetrical relative to the optical axis.

31. An optical scanning apparatus for optically scanning a surface to be scanned at a constant velocity, the optical scanning apparatus comprising:

a light source for producing a luminous flux;

a first optical lens system for forming the luminous flux into a linear image;

an optical deflector for deflecting the luminous flux formed as the linear image in a direction corresponding to a main scanning direction, the optical deflector having a deflecting plane located near where the linear image is formed;

a scanning image forming lens for transmitting and condensing the deflected luminous flux on a surface to be scanned as a light spot so that the surface to be scanned is scanned; wherein the scanning image forming lens includes a first lens located at a side of the optical deflector, the first lens being a positive meniscus lens with a concave surface facing toward the optical deflector and having a co-axial aspherical shape at both surfaces thereof, both surfaces of the first lens being shaped such that a radius of curvature decreases as the position moves away from the optical axis in the direction corresponding to the main scanning direction, and a second lens located at a side of the surface to be scanned, the second lens having a non-arc shape in the deflected plane at a surface of the second lens at a side of the optical deflector, the surface of the second lens having the non-arc shape being shaped such that a radius of curvature in a sub scanning cross-section changes in a direction corresponding to the main scanning direction such that a curvature center line plotting a curvature center in the sub scanning cross-section of the lens surface in the direction corresponding to the main scanning direction is a curve which is different from the non-arc shape in the deflected plane, and the non-arc shape in the deflected plane of the second lens defines a smooth curve which is concave facing toward the optical deflector at a portion of the second lens near the optical axis and convex facing toward the optical deflector at a peripheral portion of the second lens spaced from the optical axis.

* * * * *